(12) United States Patent
Püskül

(10) Patent No.: US 11,635,521 B2
(45) Date of Patent: Apr. 25, 2023

(54) METHOD AND DEVICE FOR OPTICAL DISTANCE MEASUREMENT

(71) Applicant: Microvision GmbH, Redmond, WA (US)

(72) Inventor: Özgür Püskül, Hamburg (DE)

(73) Assignee: Ibeo Automotive Systems GmbH, Hamburg (DE)

( * ) Notice: Subject to any disclaimer, the term of this patent is extended or adjusted under 35 U.S.C. 154(b) by 477 days.

(21) Appl. No.: 16/640,999

(22) PCT Filed: Jan. 24, 2019

(86) PCT No.: PCT/EP2019/051745
§ 371 (c)(1),
(2) Date: Feb. 21, 2020

(87) PCT Pub. No.: WO2019/145417
PCT Pub. Date: Aug. 1, 2019

(65) Prior Publication Data
US 2021/0124053 A1      Apr. 29, 2021

(30) Foreign Application Priority Data
Jan. 25, 2018  (EP) .................................... 18153465

(51) Int. Cl.
  *G01S 17/931*   (2020.01)
  *G01S 7/481*   (2006.01)
  *G01S 7/497*   (2006.01)

(52) U.S. Cl.
  CPC .......... *G01S 17/931* (2020.01); *G01S 7/4815* (2013.01); *G01S 7/4816* (2013.01); *G01S 7/4972* (2013.01)

(58) Field of Classification Search
CPC .... G01S 17/931; G01S 7/4815; G01S 7/4816; G01S 7/4972
See application file for complete search history.

(56) References Cited

U.S. PATENT DOCUMENTS 7,064,817 B1 *  6/2006  Schmitt ................. G01S 7/4972
                                                    356/3.01

FOREIGN PATENT DOCUMENTS

| DE | 10 2009 047303 A1 | 6/2011 |
| DE | 10 2017 111571 A1 | 11/2017 |
| EP | 2 306 217 A1 | 4/2011 |
| EP | 3 168 641 A1 | 5/2017 |

\* cited by examiner

*Primary Examiner* — Michael D Lang
(74) *Attorney, Agent, or Firm* — Kelly & Kelley, LLP

(57) ABSTRACT

A method for optical distance measurement involves transmitting measuring pulses by means of a transmission matrix having a plurality of transmission elements, reflecting transmitted measuring pulses to at least one object, and receiving reflected measuring pulses by a reception matrix. The reception matrix includes a plurality of reception elements each having a plurality of reception sub-elements. The method involves monitoring reception rates of reception sub-elements of the reception matrix for determining a misalignment between the transmission matrix and reception matrix, wherein the transmission matrix and reception matrix define a visual field, and wherein the method is used for the navigation of a vehicle. Monitoring takes place while a vehicle is traveling, wherein the method does not involve the conscious introduction of measuring objects into the visual field for determining a misalignment.

18 Claims, 3 Drawing Sheets

METHOD AND DEVICE FOR OPTICAL DISTANCE MEASUREMENT

TECHNICAL FIELD

The invention relates to a method as well as a device for optical distance measurement.

PRIOR ART

LIDAR (an acronym for "light detection and ranging") sensors are known from prior art. They comprise a transmission matrix for transmitting measuring pulses as well as a reception matrix for receiving reflected measuring pulses, which are reflected by objects within the measuring range of the sensor. Based on the time of flight principle, the speed of light is used to infer the distance to the objects that reflected the measuring pulses. However, such 3D-LIDAR sensors are very susceptible to a misalignment between the transmission matrix and reception matrix. The presence of a misalignment diminishes the range of the 3D-LI DAR sensor, wherein a strong misalignment can even lead to a blind spot in the distance measurement.

DESCRIPTION OF THE INVENTION: OBJECT, SOLUTION, ADVANTAGES

The object of the invention is to improve a method as well as a device for distance measurement in such a way as to maximize the range, in other words the length of the measuring range, in which the distance to objects can be inferred.

The aforementioned object is achieved by a method for optical distance measurement, which comprises transmitting measuring pulses by means of a transmission matrix, reflecting transmitted measuring pulses on at least one object, and receiving reflected measuring pulses by means of a reception matrix. The transmission matrix comprises a plurality of transmission elements, while the reception matrix comprises a plurality of reception elements. The reception elements further each have a plurality of reception sub-elements. The method comprises monitoring reception rates of reception sub-elements of the reception matrix for determining a misalignment between the transmission matrix and reception matrix. In particular, the reception rates of reflected and received measuring pulses are monitored by reception sub-elements.

The measuring pulse reflected by the object is a measuring pulse that was transmitted beforehand, so that the reflection on the object has changed its direction of propagation. The reflected measuring pulse can thus be understood as an echo of the transmitted measuring pulse. In particular, the method is used to determine the propagation time of the measuring pulses to the objects which reflected the latter, and from that the distance to the object covered by the respective measuring pulse using the speed of light. All transmitted measuring pulses need here not be reflected on objects; rather, it can be the case that measuring pulses are not reflected on an object, and hence not received by the reception matrix in the form of a reflected measuring pulse.

An optical distance measurement is characterized in that optical signals, here optical measuring pulses, are used to determine distances. The distance covered by the measuring pulse is to be understood as the stretch between the transmission element that transmitted the measuring pulse and the object that reflected it, plus the stretch between the object and the reception element that received the corresponding reflected measuring pulse. In particular, the method comprises considering the precise position of the transmission element and reception element, in particular in relation to each other. Since the at least one object typically is a three-dimensional object, making it possible for several areas of the object to be situated closer and other areas of the object to be situated farther away, the term "distance to the object" refers to the distance to at least one location of the object, specifically to the location which was hit by the measuring pulse and reflected the latter. Propagation time is to be understood as the time taken by the measuring pulse for the distance described above. The method is used primarily for distance measurement as applied in the driverless navigation of vehicles. To this end, the distances to all objects lying within a measuring range are determined.

In particular, a measuring pulse is an optical, in particular electromagnetic, signal. The measuring pulse is advantageously a light pulse, i.e., a pulse with a wavelength from the region of the electromagnetic spectrum visible to the human eye. A measuring pulse advantageously has a pulse duration, so that the measuring pulse can be understood as a time-limited portion of electromagnetic radiation. Since the measuring pulse is an electromagnetic signal, and thus the speed of the measuring pulse is known, the stretch the measuring pulse has covered within the propagation time can be inferred from the propagation time of a measuring pulse using the speed of light.

In particular, the term "transmission matrix" is to be understood as an array of transmission elements. In particular, a matrix can be understood as a three-dimensional, in particular plate-shaped, body, whose one surface has arranged on it the corresponding elements, transmission elements or reception elements. The transmission elements preferably each are a laser, so that the transmission matrix is to be understood as a laser array.

In particular, the reception matrix is a photosensitive surface matrix. This means that a surface of the reception matrix is configured to be photosensitive, and is thus suitable for receiving measuring pulses that were previously transmitted by the transmission matrix and reflected on objects. In particular, the reception matrix is a cell detector comprised of diodes, in particular avalanche photodiodes, most preferably single photon avalanche diodes, or pin diodes.

The reception matrix comprises reception elements and reception sub-elements. The reception sub-elements are characterized in that they constitute a subunit of the reception elements. A reception element can advantageously have allocated to it at least 4, preferably at least 6, at most preferably at least 10, reception sub-elements and/or at most 30, further preferably at most 25, most preferably at most 20, reception elements as a subunit of the reception element. In particular, the reception elements are pixels, while the reception sub-elements are comprised of subpixels. Pixels and subpixels here differ in particular in terms of their size. A subpixel preferably covers at most ¼, further preferably at most ⅙, most preferably at most 1/10, and/or at least 1/30, further preferably at least 1/25, most preferably at least 1/20, of the surface of a pixel. The subpixels are preferably arranged in such a way as to form a cohesive surface, specifically the surface of the pixel. Subpixels can further be logically OR'd.

In particular, the reception elements and/or reception sub-elements of the reception matrix are arranged in lines and columns, wherein the distance between the respective lines and respective columns can be constant, or this distance can vary.

In particular, a reception element comprises at least two, in particular at least four, especially preferably 16, reception sub-elements. In particular, the reception matrix itself comprises a plurality of reception elements, which are arranged above all in 128 lines and 256 columns.

The method preferably comprises defining the reception elements and reception sub-elements within the reception matrix. In particular, the definition comprises the precise locational placement of the reception elements and reception sub-elements, in other words an establishment of their coordinates within the photosensitive surface of the reception matrix.

The method according to the invention provides that the reception rates be monitored by at least two reception sub-elements of the reception matrix. A reflected measuring pulse is typically imaged onto more than one reception sub-element of the reception matrix based on its diameter. The reception rate is preferably to be understood as the number of photons of the measuring pulse received with the help of the corresponding reception sub-element. For the sake of simplicity, reception elements having reception sub-elements that are monitored will be referred to as monitored reception elements.

Monitoring preferably comprises determining the reception rate at various times and observing the behavior of the rates over time. In other words, the change in the reception rate over time is monitored. Alternatively or additionally, the reception rate itself can be monitored, i.e., in an absolute manner. For example, at least one threshold can be determined, below which the reception rate of a monitored reception sub-element should not drop. In addition, monitoring can involve comparing the reception rates of the monitored reception sub-elements of the same reception element. This advantageously serves to detect a "shift" in an image of a measuring pulse on the monitored reception sub-elements.

In particular, the method comprises determining a misalignment. A misalignment can be determined given a drop below the threshold of at least one reception sub-element, for example to at least 25%, further preferably to at least 50%, of the monitored reception sub-elements. In addition, a threshold can be determined with regard to the relative change in the reception rate. A misalignment can advantageously be determined if a reception rate of at least one monitored reception sub-element drops to a value of below 75%, preferably to a value of below 50%, of an initially measured value.

In particular, reception rates of reception sub-elements of at least two reception elements are monitored. As a consequence, reception sub-elements of various reception elements are advantageously monitored. Monitoring more than two reception elements is advantageous for acquiring all optically possible misalignments, in particular geometric shifts and curvatures, between the transmission matrix and reception matrix.

In particular, the method comprises an allocation, in particular a 1:1 allocation, of transmission elements of the transmission matrix to reception elements of the reception matrix. The method further comprises adjusting transmission elements to the allocated reception elements. In other words, which reception sub-elements of the reception elements on which the measuring pulses of the respective transmission element will be imaged is determined and, by correspondingly arranging the transmission matrix relative to the reception matrix, realized. In an additional step, the method comprises defining reception elements and reception sub-elements to be monitored. The reception sub-elements to be monitored are advantageously exactly the reception sub-elements on which the measuring pulses of the transmission elements are imaged.

For a distance measurement having a maximum range, it is advantageous that there be no misalignment of the transmission matrix on the reception matrix. The transmission matrix is thus optimally tailored precisely to the reception matrix. In other words, the respective measuring pulses are imaged precisely on a central area of the reception elements. Monitoring the reception rates makes it possible to determine whether the matching between the transmission matrix and reception matrix is still optimal. If the alignment has shifted, the reception rates will change accordingly. As a result, a misalignment can be detected in an effective manner. A misalignment is present if a measuring pulse of a transmission element is no longer imaged in a central area of the corresponding reception element or is no longer imaged on the reception element at all.

In particular, the method does not comprise a flash process, but rather a scanning process, in which transmission elements of the transmission matrix are actuated sequentially, in particular by line and/or column.

The method is used for the navigation of a vehicle, in particular for the driverless navigation of a vehicle, wherein monitoring takes place while the vehicle is traveling. Monitoring preferably takes place during, i.e., parallel to, an optical distance measurement. In particular, the method comprises determining at least one distance to at least one object, wherein monitoring takes place while determining the at least one distance. Primarily the same transmitted and received measuring pulses are used for determining the at least one distance to at least one object and for monitoring purposes. As a consequence, the measuring data utilized for monitoring one of the reception rates, and hence for potentially determining a misalignment, are simultaneously also used for measuring the distance to objects. For this reason, a misalignment can be immediately detected and corrected.

The transmission matrix and reception matrix preferably define a measuring range, in other words a visual field, from which reflections are to be expected. In particular, the length of the visual field or measuring area is referred to as the range of the method or a device for implementing the method. In order to determine a misalignment, measuring pulses are transmitted into the measuring area, and their reflections are received after reflected on objects located in the measuring area. Based on the received measuring pulses, the reception rates of the monitored reception sub-elements are determined and monitored. In particular, the method here in particular does not involve the conscious introduction of measuring objects into the visual field, based on which a misalignment is to be determined. Instead, monitoring takes place based on objects that are randomly located in the visual field. Therefore, no measuring object is specifically introduced into the visual field that serves only for monitoring a misalignment; rather, monitoring can be determined while a vehicle is traveling based on real objects, i.e., not based on objects consciously introduced into the visual field. As a result, monitoring can take place during a drive. Because misalignments are determined, less stringent requirements are placed on the adjustment of the transmission matrix and reception matrix, since a possible misalignment can be immediately detected and corrected. In addition, it results in a softening of adjustment tolerances. The complexity of the optics carrier of the reception matrix for preventing high tolerances is reduced. In addition, a maximum range covering all environmental conditions can be guaranteed, while simultaneously optimizing the signal-to-noise ratio.

In addition, the method preferably uses no back reflections of part of the transmitted measuring pulses within the reception matrix so as to determine a misalignment.

The method preferably comprises deactivating unmonitored reception sub-elements, while monitored reception sub-elements are active.

In particular, the reception rates of a each at least two reception sub-elements of at least three, preferably of at least five, most preferably of at least nine, reception elements are monitored. Not all reception sub-elements of a reception element are preferably monitored. In particular, at most 50% of all reception sub-elements, preferably at most 25% of all reception sub-elements, are monitored.

In particular, at least one monitored reception element is arranged in an outermost line or an outermost column of the reception matrix. In particular, the monitored reception elements comprise the reception elements that form the corners of the reception matrix.

In the case of three monitored reception elements, the latter are preferably arranged in a triangle, while a four-cornered arrangement is advantageous when monitoring four reception elements. Given five reception elements, primarily a four-cornered arrangement with a reception element in the middle is most preferred (similarly to how a five is shown with dots on a dice). If nine reception elements are now enlisted for monitoring purposes, the latter are arranged in particular in three rows and three columns (similarly to how a nine is shown with dots on a dice).

The reception rates of at least two, in particular at least three, most preferably at least four, reception sub-elements per reception element are advantageously monitored. In particular, the monitored reception sub-elements are arranged in a central area within the corresponding reception element. In particular, the two, three or four reception sub-elements form the inner, centrally arranged reception sub-elements of the monitored reception element. In particular, the method involves no metrological determination of an area of the reception element, e.g., of reception sub-elements of a reception element, which is to be illuminated given an optimal alignment. A misalignment is determined directly by monitoring reception rates, and not by comparing the position of an image of a measuring pulse with an optimal position.

In particular, if a misalignment is determined between the transmission matrix and reception matrix, no alignment of optics, in particular of a device for implementing the method, is performed to correct the misalignment. In particular, if a misalignment is determined between the transmission matrix and reception matrix, a redefinition of reception elements and/or reception sub-elements is performed. Previously locally defined reception elements and/or reception sub-elements are redefined based on the misalignment. In particular, a change takes place in the coordinates of the reception elements and/or reception sub-elements on the photosensitive surface of the reception matrix. As a result, a misalignment can be corrected. In addition, the method can comprise a redefinition of the reception sub-elements now being monitored. In particular, the now redefined reception sub-elements can be monitored, wherein the previous reception sub-elements whose reception rates have changed too drastically and/or whose absolute reception rate is too low are no longer monitored. In addition, the method can comprise a new OR-ing, i.e., a change in the logical linkage, between the redefined reception sub-elements and the respective reception element. In other words, the redefined reception sub-elements are logically combined with the other monitored reception sub-elements and accompanying reception element, while reception elements no longer being monitored are no longer logically linked.

In addition, once a misalignment has been found between the transmission matrix and reception matrix, a reallocation of transmission elements to reception elements and/or reception sub-elements can take place. In other words, the matching between the transmission elements and reception elements or reception sub-elements is redetermined, so as to offset the misalignment. For example, adjacent transmission elements can be used instead of the transmission elements determined in a preceding definition given misalignments, in particular if the resolution of the transmission matrix corresponds to that of the reception sub-elements. The preceding definition primarily involves a base calibration, which was performed in the last step of manufacturing a corresponding device for implementing the method, at the "end of line", so to say.

In summary, the redefinition of reception sub-elements and/or reception elements and/or the reallocation of transmission elements to reception elements and/or reception sub-elements leads to a direct correction of the misalignment, which is always adjusted to the monitoring result. Monitoring is also dynamic, since it uses no fixedly defined reception elements or reception sub-elements, with the reception elements or reception sub-elements to be monitored instead being adjusted to the monitoring results, in particular to previously determined misalignments.

A floor area of the visual field advantageously has allocated to it at least one reception element, preferably several reception elements. The transmission matrix and reception matrix are thus preferably arranged in such a way that these reception elements receive measuring pulses, which were previously reflected by the floor or by objects located in proximity to the floor. In particular, the reception rates of reception sub-elements are monitored by at least one reception element, which can be allocated to a floor area. In particular, all reception elements allocated to the floor area can be monitored. Monitoring reception elements allocated to the floor area is especially advantageous, because reflections are to be expected at least very regularly from the floor area, regardless of the environment of the vehicle. This makes it possible to ensure regular monitoring.

The reception rates of the monitored reception sub-elements of a reception element are especially preferably determined by means of a respectively allocated evaluation unit. As a consequence, the monitored reception sub-elements, which can be allocated to the same reception element, are separately evaluated by a separate evaluation unit allocated to each individual one of the reception sub-elements. The evaluation unit is designed above all to convert the received measuring pulses into digital data. In particular, the evaluation unit is a time-to-digital converter. The evaluation units allocated to the monitored reception sub-elements primarily serve the exclusive purpose of determining and monitoring the reception rates of the monitored reception sub-elements.

Additional reception sub-elements of the respective reception elements can be allocated to the evaluation units, but are not monitored. Especially four reception sub-elements can be allocated to one evaluation unit. In particular, the additional allocated reception sub-elements are deactivated during the determination of a reception rate, however, so that only one active, i.e., monitored, reception sub-element is allocated to an evaluation unit. As a consequence, an evaluation unit is used very specifically to "count" photons stemming from a single monitored reception sub-element.

In other words, a 1:1 allocation is achieved per time between the evaluation unit and monitored reception sub-element. Multiplexing makes it possible to allocate the evaluation units to a respective other monitored reception sub-element of another reception element at some other point in time, for example a reception element of another column or line.

In particular, the reception elements of the reception matrix are arranged in lines and columns, wherein the reception rates of monitored reception sub-elements of reception elements arranged within the same line or column are evaluated simultaneously. In other words, monitored reception elements that are located in the same line or in the same column are evaluated simultaneously. Since the method involves a scanning process, these reception elements located in the same column or line are evaluated by actuating the corresponding line or column of the transmission matrix, so that these transmission elements arranged there transmit measuring pulses. Reception elements of additional lines or columns are illuminated by sequentially actuating the transmission matrix, and linked to the evaluation units via a multiplexer by linking the columns and/or lines of the reception matrix.

The determined reception rates of the monitored reception sub-elements are stored in a data rate table. The data, i.e., the stored reception rates, on this data rate table can be used to determine how the reception rates develop over time. In particular, the method comprises statistically analyzing the reception rates of the data rate table, preferably determining the behavior of the reception rates over time. In addition, the data can be compared with a threshold for the reception rates. In particular, the data of the data rate table can be used to estimate the range.

The method further comprises generating an activation table. How the reception sub-elements are OR'd can be derived from the latter.

In particular, the method comprises updating data of the activation table based on monitoring the reception sub-elements. This makes it possible to achieve a redefinition of reception elements and/or reception sub-elements and/or a reallocation of reception elements and/or reception sub-elements to transmission elements.

After a redefinition of reception sub-elements and/or reception elements, the data of the data rate table are updated. This means that the reception rates of the newly monitored reception sub-elements are now stored, and no longer those of the reception sub-elements no longer being monitored.

Therefore, the data rate table and/or activation table is a dynamic table, which is adjusted to the monitoring results, in particular to a previously determined misalignment.

The activation table can further serve as a "look up" table for determining the at least one distance, in other words the actual distance measurement. The method comprises above all using the data of the activation table for determining at least one distance to at least one object. Determining at least one distance to at least one object involves above all transmitting measuring pulses, reflecting transmitted measuring pulses on at least one object, and receiving reflected measuring pulses by means of the reception matrix. Prior to transmission, the activation table is preferably consulted to determine the reception elements from which measuring pulses are to be received and, based on the allocation between transmission elements and reception elements, which transmission elements are to transmit measuring pulses. Which reception sub-elements are "OR'd" is derived in detail from the activation table. As a consequence, at least one distance to an object that has reflected measuring pulses is determined dynamically, specifically always considering the results of monitoring, in particular of a previously determined misalignment.

In particular, the at least one distance is determined based on exactly the reception sub-elements and accompanying transmission elements currently being monitored. In an additional aspect, the invention relates to a device for optical distance measurement that is designed to monitor reception rates of reception sub-elements of a reception matrix of the device so as to determine a misalignment between a transmission matrix and the reception matrix. The device is used for implementing the method described above.

The transmission matrix of the device is used to transmit measuring pulses, and comprises a plurality of transmission elements, while the reception matrix is used to receive reflected measuring pulses, and comprises a plurality of reception elements. The reception elements comprise a plurality of reception sub-elements. The transmission matrix and/or the reception matrix are preferably designed as described above. In particular, the device is designed as a 3D-LIDAR sensor.

Each of the monitored reception sub-elements of a reception element preferably has allocated to it a separate evaluation unit for determining the reception rate of the respective reception sub-element. For example, if two reception sub-elements of a reception element are monitored, each of the two is allocated its own evaluation unit. Aside from the evaluation units allocated to the monitored reception sub-elements, which are primarily used exclusively for determining the reception rates of the monitored reception sub-elements, the device can have even more evaluation units, in particular time-to-digital converters, which serve exclusively to determine the distance to objects in the measuring area. In particular, each line or column of the reception matrix can have allocated to it an evaluation unit, which can evaluate all reception elements of the respective line or column based on multiplexing.

The invention further relates to a computer program product comprising a computer-readable storage medium, on which is stored a program that, once it has been loaded into the memory of the computer, enables a computer to implement a method described above, if necessary in conjunction with a device described above. In addition, the invention relates to a computer-readable storage medium, on which is stored a program that, once it has been loaded into the memory of the computer, allows a computer to implement a method described above, if necessary in conjunction with a device described above.

BRIEF DESCRIPTION OF THE DRAWINGS

Schematically shown on.

PREFERRED EMBODIMENTS OF THE INVENTION

Figure 1:
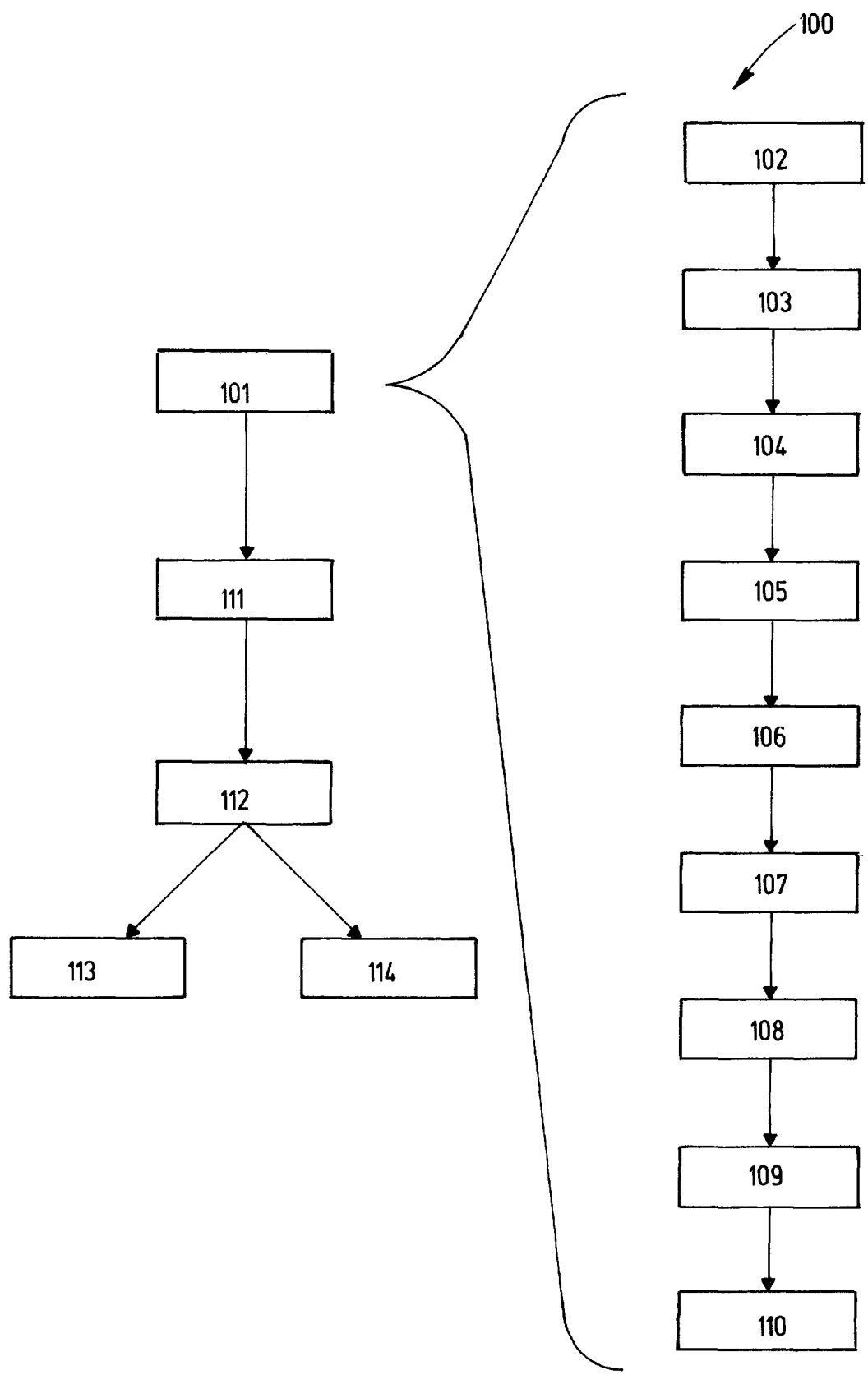
FIG. 1 is a process diagram for a method according to the invention.

FIG. 1 shows a process diagram of a method (100) according to the invention for distance measurement.

The method (100) comprises monitoring (101) reception rates of reflected and received measuring pulses of reception sub-elements (13) of a reception matrix (11). In a first step, monitoring (101) preferably comprises defining (102) reception elements (12) and/or reception sub-elements (13) of the reception matrix (11). In addition, transmission elements of a transmission matrix can be allocated (103) to reception elements (12) of the reception matrix (11). In particular, this is followed by a definition (104) of reception elements (12) and reception sub-elements (13) to be monitored. Each of the monitored reception sub-elements (13) of a reception element (12) can be allocated (105) its own evaluation unit (17). Unmonitored reception sub-elements (13) can be deactivated (106), while monitored reception sub-elements (13) can be activated. After measuring pulses have been transmitted (107) and then reflected (108) by at least one object in a measuring area, the reflected measuring pulses are received (109). In particular, measuring pulses are transmitted (107) sequentially, so that lines or columns of the transmission matrix are activated one after the other, and thus transmit a measuring pulse. In particular, measuring pulses are transmitted exclusively by transmission elements allocated to the monitored reception elements (12).

Since unmonitored reception sub-elements (13) are preferably deactivated, the measuring pulses that were reflected by at least one object can be received exclusively by the activated monitored reception sub-elements (13). A respective reception rate is determined (110) from the monitored reception sub-elements (13). In particular, this determination (110) is made by means of the respectively allocated evaluation units (17). In particular, the reception rates of monitored reception sub-elements (13) of reception elements (12) arranged within the same line or the same column of the reception matrix (11) are evaluated simultaneously.

The determined reception rates are recorded (111) in a data rate table (23). In particular, the steps of deactivating (106) unmonitored reception sub-elements (13) to entering (111) the reception rates into the data rate table take place regularly, so that the development of reception rates over time can be observed, and thus monitoring (101) is possible. As soon as a misalignment between the transmission matrix and reception matrix (11) has been determined (112), reception elements (12) and/or reception sub-elements (13) can be newly defined (113) in response, meaning the coordinates of the reception elements (12) and/or reception sub-elements (13) can be redefined, and thus the misalignment can be corrected. Alternatively or additionally, another response would be to reallocate (114) transmission elements of the transmission matrix to reception elements (12) and/or reception sub-elements (13) of the reception matrix.

Figure 2:
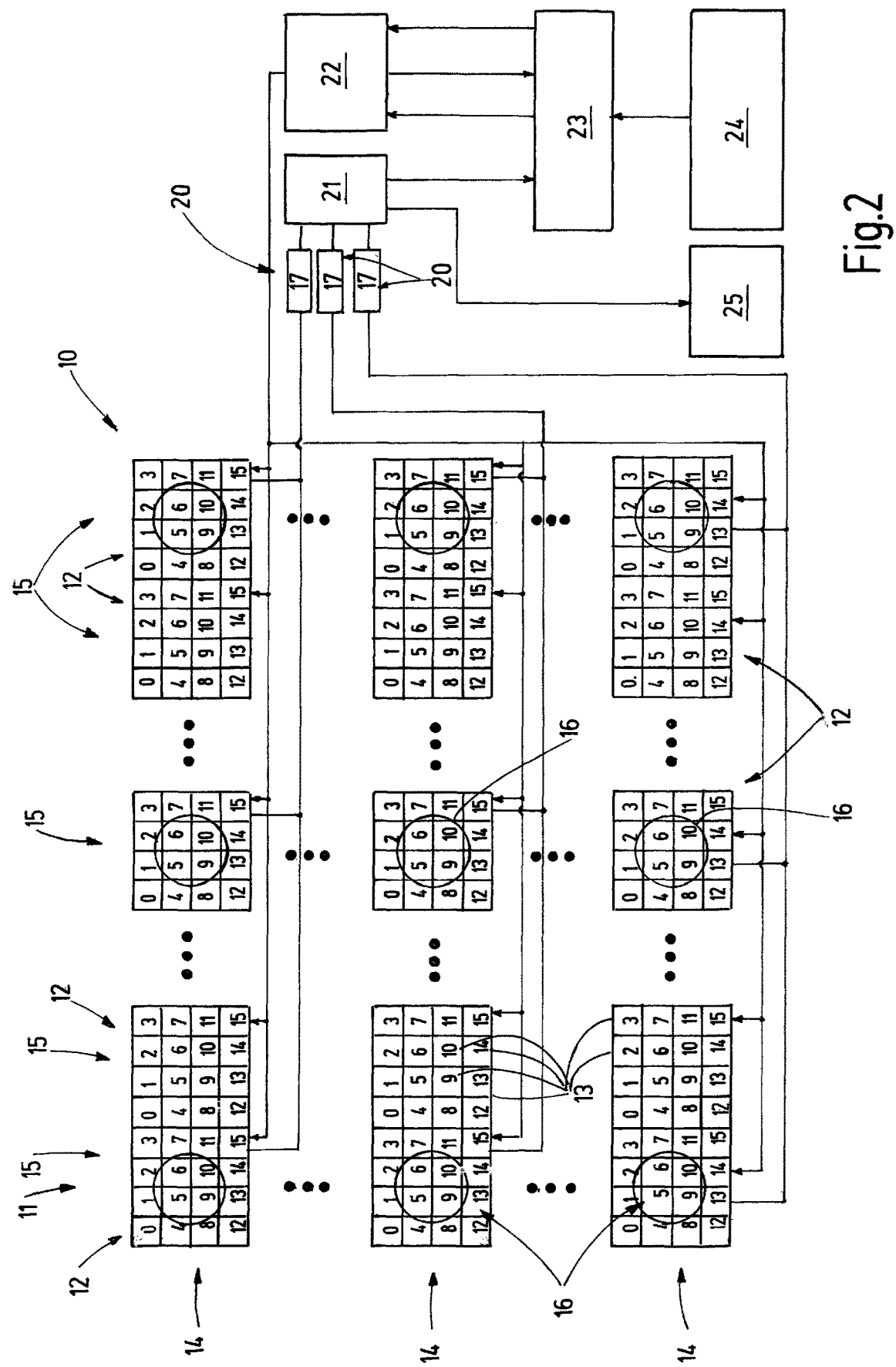
FIG. 2 is a top view of a device according to the invention.

FIG. 2 shows a top view of a device (10) for optical distance measurement.

The device (10) comprises a reception matrix (11). The reception matrix (11) comprises reception elements (12), which are arranged in lines (14) and columns (15). In all, the reception matrix (11) comprises 256 columns (15) and 128 lines (14). FIG. 2 does not show all reception elements (12) of the reception matrix (11), but rather just a portion thereof. The lines (14) and columns (15) of the reception matrix (11) on FIG. 2 are labeled with numbers starting with 0 in the left upper corner to 127 in the left lower half relative to the lines (14), as well as starting with 0 in the left upper corner to 255 in the right upper corner with regard to the columns (15). Each reception element (12) is thus clearly defined by indicating the line number and column number, wherein the first number denotes the line and the second number the column in which the reception element (12) is arranged. As an example, the reception element (12) in the left upper corner of the reception matrix (11) is clearly marked 0/0.

Each reception element (12) comprises a plurality of reception sub-elements (13). More precisely, each reception element (12) comprises 16 reception sub-elements (13), which are clearly defined on FIG. 2 by indicating a number between 0 and 15. In the present example, reception sub-elements (13) of nine reception elements (12) are monitored. For the sake of simplicity, reception elements (12) having monitored reception sub-elements (13) will be labeled as monitored reception elements (12).

The nine monitored reception elements (12) are formed by the four reception elements in the corners of the reception matrix (11), specifically by the reception elements 0/0, 0/255, 127/0, 127/255. In addition, the reception element (12) in the middle of the reception matrix (11) is monitored, specifically the reception element 63/127. Monitoring is further performed on the reception elements (12) located in the middle between the monitored reception elements (12) in the corners, specifically reception elements 63/0, 0/127, 63/255, 127/127.

The method provides that the transmission elements of the transmission matrix allocated to the monitored reception elements (12) be sequentially actuated by column. Sequentially actuating column by column first illuminates column 0, wherein this moment in time is visible on FIG. 2. As a consequence, how a measuring pulse is imaged on the reception matrix (11) can be clearly derived from the figure. The image (16) of the three measuring pulses of the corresponding transmission elements to the monitored reception elements (12) of column 0 is clearly evident. In other words, the image (16) is a laser spot of the kind imaged on the reception matrix (11). The image (16) is essentially imaged on four reception sub-elements (13), specifically the central four reception sub-elements (13) numbered 5, 6, 9 and 10. Exactly these reception sub-elements (13), which are hit or to be hit by the image (16), are monitored. To this end, the remaining unmonitored reception sub-elements (13), specifically 0, 1, 2, 3, 4, 7, 8, 11, 12, 13, 14, 15, are deactivated. Activated reception sub-elements (13) are white on FIG. 2, while nonactivated ones are grey.

Figure 4:
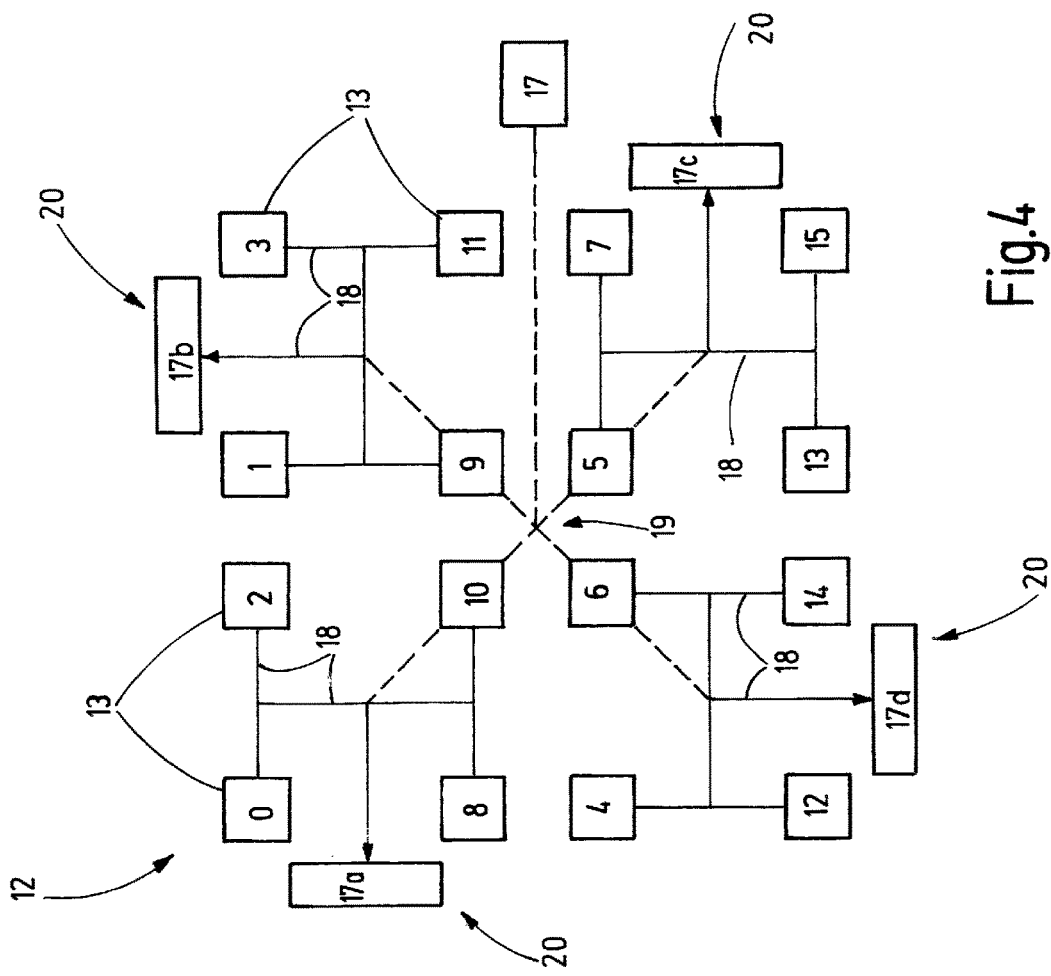
FIG. 4 is the wiring of the reception sub-elements of the reception element according to FIG. 3.
Figure 3:
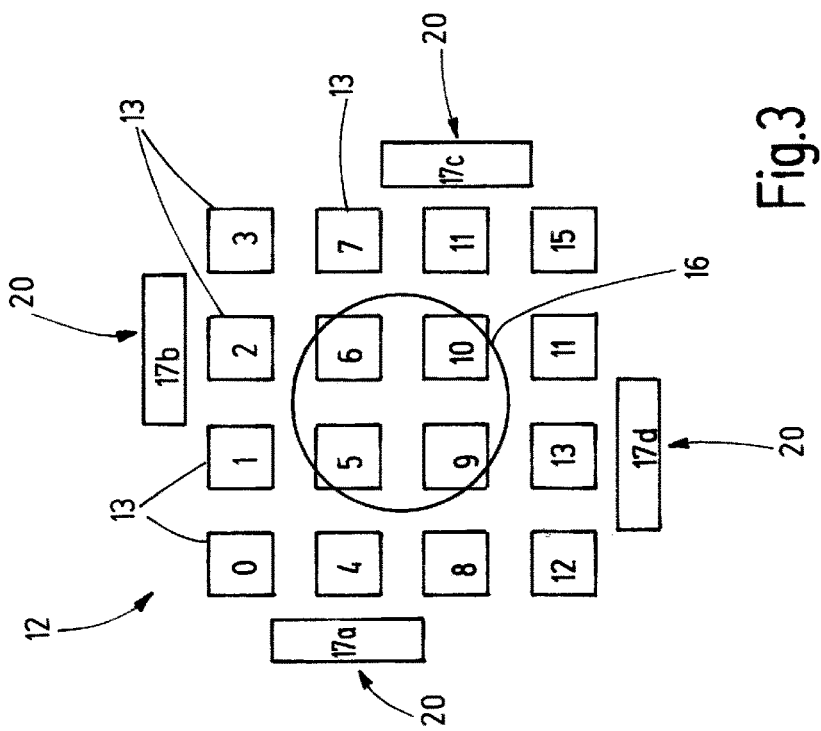
FIG. 3 is a top view of a reception element of a reception matrix according to FIG. 2.

Each monitored reception sub-element (13) of a reception element (12) is allocated its own evaluation unit (17) for monitoring the reception rate, as explained in even more detail on FIGS. 3 and 4. The reception rates of the reception sub-elements (13) of the monitored reception elements (12) of the first column 0 are evaluated simultaneously.

Each line (14) of reception elements (12) is allocated its own evaluation unit (17), namely a time-to-digital converter (20), for distance measurement, which can evaluate all reception elements (12) of the respective line via multiplexing and sequential actuation.

The device (10) further comprises a unit (21) for determining the reception rates. The determined reception rates are stored in a data rate table (23). The data are further fed to an object recognition unit (25). The data of the data rate table (23), which show the change in the monitored reception rates over time, are fed to a control unit (22) for the reception elements (12) and/or reception sub-elements (13). The control unit (22) can be used to redefine the coordinates of the reception elements (12) and/or reception sub-elements (13). The device (10) further comprises a configuration unit (24), which originally determined the coordinates of the reception elements and/or reception sub-elements.

The other monitored columns of the reception matrix (11) on FIG. 2 also record the position of the image (16) of a measuring pulse as a circle. As soon as the corresponding column of the transmission matrix is actuated, the corresponding reception elements (12) should be illuminated precisely at this location.

FIG. 3 shows a top view of a reception element (12) of the reception matrix (11) of FIG. 2.

The reception sub-elements (13) with numbers 0 to 15 are clearly visible. Four evaluation units (17) are allocated to the various reception sub-elements (13). To be precise, four reception sub-elements (13) are each allocated to an evaluation unit (17). More specifically, the reception sub-elements 0, 2, 8 and 10 have allocated to them a first evaluation unit (17a), while the reception sub-elements 1, 3, 9 and 11 have allocated to them a second evaluation unit (17b). A third evaluation unit (17c) is allocated to the reception elements 4, 6, 12 and 14, while a fourth evaluation unit (17d) is allocated to the reception elements 5, 7, 13 and 15. However, since only the reception sub-elements (13) 5, 6, 9 and 10 are activated, the activated and monitored reception sub-elements (13) are each allocated their own evaluation unit (17), so that the detection rates of precisely one respective monitoring reception sub-element (13) can be evaluated.

Also visible on FIG. 3 is the image (16) of a measuring pulse on the reception matrix (11), more specifically the depicted reception element (12). Should a misalignment arise between the transmission matrix and reception matrix (11), the image (16) of the measuring pulse would arise on the reception matrix (11), here of the reception element (12). For example, if the image (16) shifts to the right, the reception rates of the monitored reception sub-elements 5 and 9 would decrease, while the reception rates of the monitored reception sub-elements (13) 6 and 10 would increase. As a consequence, a misalignment can be determined by monitoring the reception rates.

FIG. 4 shows the wiring of the reception sub-elements (13) of the reception element (12) of FIG. 3. The reception sub-elements (13), which are allocated to the same evaluation unit (17), are each connected with the respective evaluation unit (17) by lines (18). The data flows over a shared node point (19) to a shared evaluation unit (17) for the respective line (14) that is used for the actual distance measurement (see FIG. 2).

The invention claimed is:

1. A method for optical distance measurement, comprising the steps of:
   transmitting measuring pulses by means of a transmission matrix comprising a plurality of transmission elements;
   reflecting transmitted measuring pulses on at least one object; and
   receiving reflected measuring pulses by means of a reception matrix comprising a plurality of reception elements each having a plurality of reception sub-elements; and
   monitoring reception rates of reception sub-elements of the reception matrix for determining a misalignment between the transmission matrix and the reception matrix;
   wherein the transmission matrix and reception matrix define a visual field;
   wherein the method is used for the navigation of a vehicle, wherein the monitoring takes place while a vehicle is traveling; and
   wherein the method does not involve the conscious introduction of measuring objects into the visual field for determining a misalignment,
   wherein the reception elements are pixels, and the reception sub-elements are subpixels.

2. The method according to claim 1, wherein unmonitored reception sub-elements are deactivated for monitoring purposes.

3. The method according to claim 1, wherein the reception rates of each at least two reception sub-elements of at least three, preferably at least five, most preferably of at least nine, reception elements are monitored.

4. The method according to claim 1, wherein the reception rates of at least two, in particular of at least three, most preferably of at least four, reception sub-elements per reception element are monitored.

5. The method according to claim 1, wherein the method comprises defining reception elements and/or reception sub-elements, and redefining reception elements and/or reception sub-elements if a misalignment is determined between the transmission matrix and reception matrix.

6. The method according to claim 5, wherein the reception elements and/or the reception sub-elements are redefined by means of updating an activation table.

7. The method according to claim 1, wherein the method comprises allocating transmission elements of the transmission matrix to reception elements of the reception matrix, and
reallocating transmission elements to reception elements and/or reception sub-elements if a misalignment is determined between the transmission matrix and reception matrix.

8. The method according to claim 1, wherein the reception rates of the monitored reception sub-elements of a reception element are determined by means of a respectively allocated evaluation unit, wherein the evaluation units allocated to the monitored reception sub-elements are used exclusively to determine and monitor the reception rates of the monitored reception sub-elements.

9. The method according to claim 1, wherein the reception elements of the reception matrix are arranged in lines and columns, and wherein the reception rates of monitored reception sub-elements of reception elements arranged within the same line or column are evaluated simultaneously.

10. The method according to claim 1, wherein reception rates of the monitored reception sub-elements are stored in a data rate table.

11. The method according to claim 10,
    wherein the reception rates stored in the data rate table are used for range estimation.

12. The method according to claim 10, wherein the method comprises statistically analyzing the reception rates of the data rate table, by determining the behavior of the reception rates over time.

13. The method according to claim 1, wherein the method comprises determining at least one distance to at least one object, and wherein monitoring takes place while determining the at least one distance, so that a misalignment is immediately detected and corrected.

14. The method according to claim 13, wherein the same transmitted and received measuring pulses are used for determining the at least one distance to at least one object and for monitoring purposes.

15. The method according to claim 1, wherein at least one reception element is allocated to a floor area of the visual field, and wherein the reception rates of reception sub-elements of at least one reception element allocated to the floor area are monitored.

16. A device for optical distance measurement, comprising:

a transmission matrix for transmitting measuring pulses having a plurality of transmission elements and a reception matrix having a plurality of reception elements for receiving reflected measuring pulses, wherein the transmission matrix and reception matrix define a visual field, and wherein the reception elements each have a plurality of reception sub-elements;

wherein the device is configured to implement a method according to any one of claims 1 to 15, wherein the device is configured to monitor reception rates of reception sub-elements of the reception matrix for determining a misalignment between the transmission matrix and reception matrix, and wherein the device is designed to navigate a vehicle and for monitoring purposes while a vehicle is traveling, without the conscious introduction of measuring objects into the visual field for determining a misalignment, wherein the reception elements are pixels, and the reception sub-elements are subpixels.

17. A computer program product comprising a computer-readable storage medium, on which is stored a program that, once it has been loaded into the memory of the computer, enables a computer to implement a method according to claim 1, if necessary in conjunction with a device according to claim 16.

18. A computer-readable storage medium, on which is stored a program that, once it has been loaded into the memory of the computer, enables a computer to implement a method according to claim 1, if necessary in conjunction with a device according to claim 16.

\* \* \* \* \*